US012229667B2

(12) United States Patent
Dong et al.

(10) Patent No.: US 12,229,667 B2
(45) Date of Patent: Feb. 18, 2025

(54) METHOD AND APPARATUS FOR GENERATING SHARED ENCODER

(71) Applicant: BEIJING BAIDU NETCOM SCIENCE AND TECHNOLOGY CO., LTD., Beijing (CN)

(72) Inventors: Daxiang Dong, Beijing (CN); Wenhui Zhang, Beijing (CN); Zhihua Wu, Beijing (CN); Dianhai Yu, Beijing (CN); Yanjun Ma, Beijing (CN); Haifeng Wang, Beijing (CN)

(73) Assignee: BEIJING BAIDU NETCOM SCIENCE AND TECHNOLOGY CO., LTD, Beijing (CN)

( * ) Notice: Subject to any disclaimer, the term of this patent is extended or adjusted under 35 U.S.C. 154(b) by 1003 days.

(21) Appl. No.: 17/209,576

(22) Filed: Mar. 23, 2021

(65) Prior Publication Data

US 2021/0209417 A1    Jul. 8, 2021

Related U.S. Application Data

(63) Continuation of application No. PCT/CN2020/083551, filed on Apr. 7, 2020.

(30) Foreign Application Priority Data

Nov. 22, 2019  (CN) .......................... 201911155509.2

(51) Int. Cl.
*G06N 3/08*  (2023.01)
*G06F 9/50*  (2006.01)
*G06F 18/214*  (2023.01)

(52) U.S. Cl.
CPC .............. *G06N 3/08* (2013.01); *G06F 9/5027* (2013.01); *G06F 9/5072* (2013.01); *G06F 18/2148* (2023.01)

(58) Field of Classification Search
CPC ...... G06N 3/08; G06F 9/5027; G06F 18/2148
See application file for complete search history.

(56) References Cited

U.S. PATENT DOCUMENTS 9,514,216 B2    12/2016  Duan et al.
2008/0262990 A1  10/2008  Kapoor et al.
2019/0138934 A1*  5/2019  Prakash .............. G06F 18/2148

FOREIGN PATENT DOCUMENTS

CN    107622310 A    1/2018
CN    109472345 A    3/2019
(Continued)

OTHER PUBLICATIONS

Hatcher et al ("A Survey of Deep Learning: Platforms, Applications and Emerging Research Trends" 2018) (Year: 2018).*
(Continued)

*Primary Examiner* — Lut Wong
(74) *Attorney, Agent, or Firm* — Lippes Mathias LLP

(57) ABSTRACT

A method and an apparatus for generating a shared encoder are provided, which belongs to a field of computer technology and deep learning. The method includes: sending by a master node a shared encoder training instruction to child nodes, so that each child node obtains training samples based on a type of a target shared encoder included in the training instruction; sending an initial parameter set of the target shared encoder to be trained to each child node after obtaining a confirmation message returned by each child node; obtaining an updated parameter set of the target shared encoder returned by each child node; determining a target parameter set corresponding to the target shared encoder based on a first preset rule and the updated parameter set of the target shared encoder returned by each child node.

15 Claims, 7 Drawing Sheets

(56) References Cited

FOREIGN PATENT DOCUMENTS

| | | | |
|---|---|---|---|
| CN | 109670594 | A | 4/2019 |
| CN | 110442457 | A | 11/2019 |
| CN | 110909875 | A | 3/2020 |

OTHER PUBLICATIONS

Gündüz et al ("Machine Learning in the Air" Sep. 16, 2019) (Year: 2019).*
International Search Report and Written Opinion for PCT Application No. PCT/CN2020/083551, Dated Jul. 29, 2020, 11 pages (in Chinese).
Extended European Search Report for Application No. 20864267.8, dated Jun. 14, 2022, 12 pages.
Office Action for Japanese Application No. 2021-516453, dated Apr. 19, 2022, 5 pages.
Office Action for Chinese Application No. 201911155509.2, dated Jun. 24, 2022, 7 pages.
Hangyu Zhu et al., "Multi-objective Evolutionary Federated Learning", IEEE, Jun. 8, 2019, 13 pages.
Takayuji Nishio et al., "Client Selection for Federated Learning with Heterogeneous Resources in Mobile Edge", Apr. 23, 2018, 7 pages.

* cited by examiner

METHOD AND APPARATUS FOR GENERATING SHARED ENCODER

CROSS-REFERENCE TO RELATED APPLICATION

This application is a continuation application of International Application No. PCT/CN2020/083551, filed on Apr. 7, 2020, which claims priority to Chinese patent application No. 201911155509.2 filed on Nov. 22, 2019 with a title of "METHOD AND APPARATUS FOR GENERATING SHARED ENCODER, AND ELECTRONIC DEVICE".

TECHNICAL FIELD

The present application relates to a field of computer technology, in particular to a field of big data technology, and a method and an apparatus for generating a shared encoder.

BACKGROUND

Pre-training models have been proven effective in fields of computer vision, natural language processing and so on. It has become a popular practice to perform pre-training with big data and then fine-tune model parameters based on specific tasks.

SUMMARY

The method and apparatus for generating a shared encoder are provided in the present disclosure.

In embodiments of the present disclosure, a method for generating a shared encoder includes: sending by a master node a shared encoder training instruction comprising a type of a target shared encoder to be trained to child nodes, to allow each child node obtains training samples based on the type; sending an initial parameter set of the target shared encoder to be trained to each child node after obtaining a confirmation message returned by each child node, so that the initial parameter set is trained by each child node with the training samples; obtaining an updated parameter set of the target shared encoder returned by each child node; and determining a target parameter set corresponding to the target shared encoder based on a first preset rule and the updated parameter set of the target shared encoder returned by each child node.

In embodiments of the present disclosure, a method for generating a shared encoder includes: obtaining by a second child node a shared encoder training instruction sent from a master node, the training instruction comprising a type of a target shared encoder to be trained; returning a confirmation message to the master node after determining that training samples that match the type are included; obtaining an initial parameter set of the target shared encoder sent from the master node; performing model training with the training samples that match the type to determine an updated parameter set of the target shared encoder; and returning the updated parameter set of the target shared encoder to the master node.

In embodiments of the present disclosure, an apparatus for generating a shared encoder includes: a non-transitory computer-readable medium including computer-executable instructions stored thereon, and an instruction execution system which is configured by the instructions to implement: a first sending module, configured to send by a master node a shared encoder training instruction comprising a type of a target shared encoder to be trained to child nodes, to allow each child node obtains training samples based on the type; a second sending module, configured to send an initial parameter set of the target shared encoder to be trained to each child node after obtaining a confirmation message returned by each child node, so that the initial parameter set is trained by each child node with the training samples; a first obtaining module, configured to obtain an updated parameter set of the target shared encoder returned by each child node; and a first determining module, configured to determine a target parameter set corresponding to the target shared encoder based on a first preset rule and the updated parameter set of the target shared encoder returned by each child node.

Other effects that the above alternative methods have will be explained below in conjunction with the specific embodiments.

BRIEF DESCRIPTION OF THE DRAWINGS

The drawings are used to better understand the solution and do not constitute a limitation to the present application, wherein.

DETAILED DESCRIPTION

The following describes example embodiments of the present application in conjunction with the accompanying drawings, which include various details of the embodiments of the present application to facilitate understanding, and should be regarded as merely exemplary. Therefore, those skilled in the art should recognize that various changes and modifications may be made to the embodiments described herein without departing from the scope and spirit of the present application. Likewise, for clarity and conciseness, descriptions of well-known functions and structures are omitted in the following description.

In the related art, it is difficult to obtain training corpus from a plurality of fields with a large cost, which makes it hard to implement pre-training models.

From the problem that it is difficult to obtain training corpus from a plurality of fields with a large cost and further difficult to implement pre-training models, a method for generating a shared encoder is provided by the embodiments of the present application.

The method and apparatus for generating a shared encoder, an electronic device and a storage medium according to the present application will be described in detail below with reference to the accompanying drawings.

Taking a master node side and a child node side as an example, the method for generating the shared encoder according to an embodiment of the present application is described below in detail.

First, taking the master node side as an example, the method for generating the shared encoder according to the embodiment of the present application will be described in detail.

The method for generating the shared encoder according to an embodiment of the present application will be described in detail below in conjunction with FIG. 1.

Figure 1:
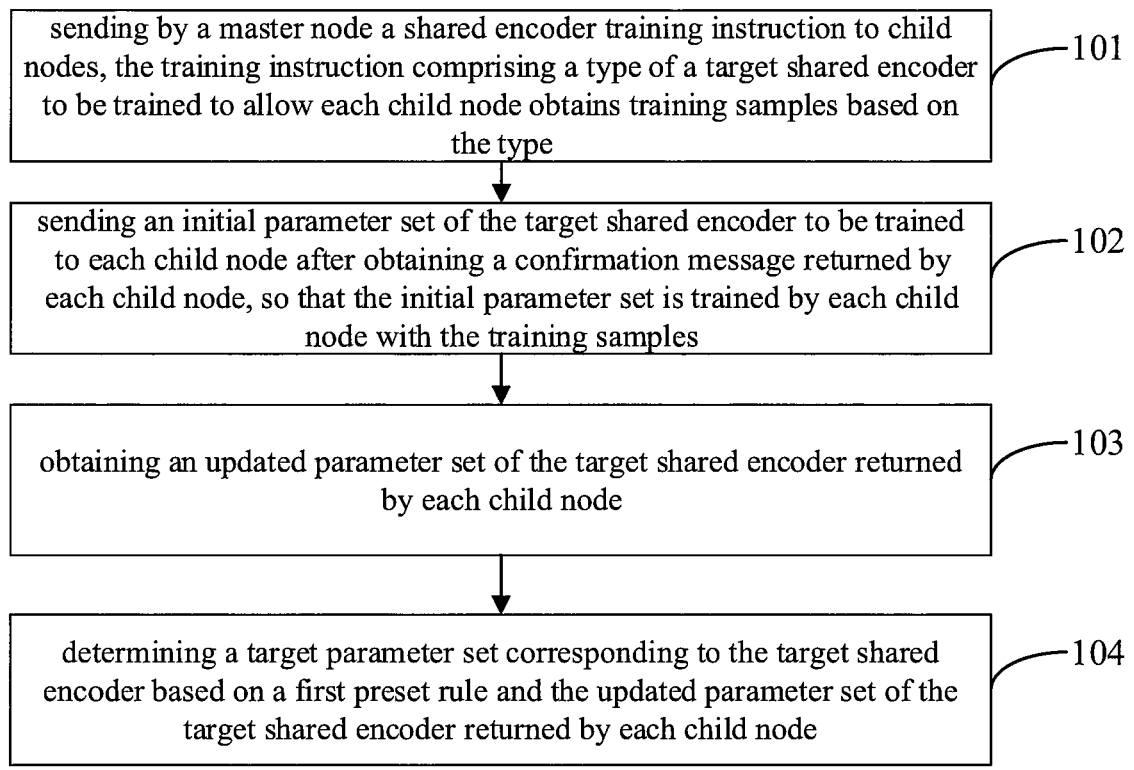
FIG. 1 is a schematic flowchart of a method for generating a shared encoder according to an embodiment of the present application.

FIG. 1 is a schematic flowchart of a method for generating a shared encoder according to an embodiment of the present application, and the method is applied to a master node.

As shown in FIG. 1, the method for generating the shared encoder includes the following steps:

Step 101: a master node sends a shared encoder training instruction including a type of a target shared encoder to be trained to child nodes, to allow each child node obtains training samples based on the type.

It should be noted that, pre-training models have been proven effective in fields of computer vision, natural language processing and so on. It has become a popular practice to perform pre-training with big data and then fine-tune model parameters based on specific tasks. However, a large amount of pre-training corpus are required for the pre-training model, while it is a difficult problem to collect unsupervised corpus from a plurality of fields. In addition, different companies and organizations have a large number of unsupervised corpus that are related to their own business and the unsupervised corpus may not be open, which makes it difficult to obtain a more powerful pre-training model by using the shared pre-training corpus. The method for generating the shared encoder of the embodiment of the present application enables a plurality of child nodes (multi-party organizations) to share the information in the training corpus with the distributed training technology in deep learning so as to obtain a shared encoder, which ensures that the security and privacy of training corpus of the child nodes.

The master node herein refers to a node configured to trigger the training process of the shared encoder. For example, when the method for generating the shared encoder of the embodiment of the present application is applied to a federated learning system, the master node may be a server of the federated learning system.

The child node herein refers to a node configured to engage in training the shared encoder with their own training samples. For example, the child node may be a server of the company or organization that engage in training the shared encoder when training the model.

In practical use, the method for generating the shared encoder in the embodiment of the present application may be applied to any scenario where a co-training is performed, which is not limited in the embodiment of the present application. The application scenario where the method for generating the shared encoder of the embodiment of the present application is applied to a federated learning system is taken as an example for detailed descriptions below.

In the embodiment of the present application, when there is a need to train a shared encoder, the master node may send a shared encoder training instruction to child nodes in the federated learning system, so that after each child node obtains the shared encoder training instruction that includes a type of a target shared encoder to be trained, it may be determined whether there are local training samples corresponding to the type of the target shared encoder included in the training instruction based on the type. In case that there are local training samples corresponding to the type, the training samples corresponding to the type of the target shared encoder are obtained.

It should be noted that, the child nodes may include various types of training samples for training different types of shared encoders, so when the master node sends a shared encoder training instruction to each child node, the type of the target shared encoder to be trained may be included, so that child nodes may obtain the training samples corresponding to the type of the target shared encoder from various types of training samples.

Further, the master node may trigger the training of the target shared encoder based on an obtaining or updating request for the target shared encoder from the child nodes. That is, in a possible implementation of the embodiment of the present application, it may further include before step 101:

obtaining by the master node a request for obtaining the target shared encoder sent by at least one child node;

or, obtaining by the master node an update request of the target shared encoder sent by at least one child node, the update request comprising an identifier of the target shared encoder.

As a possible implementation, the master node may trigger the training process of the target shared encoder based on the obtaining request for the target shared encoder from each child node before training the target shared encoder. That is, when the master node obtains the request for obtaining the target shared encoder sent by at least one child node and the obtaining request includes the initial parameter set corresponding to the target shared encoder, it may be determined that the request for obtaining the target shared encoder of at least one child node is obtained, so that the shared encoder training instruction may be sent to each child node to trigger the training process of the target shared encoder.

As a possible implementation, the master node may also trigger the training process of the target shared encoder based on the update requirements of each child node for the target shared encoder after training on the target shared encoder for one or more times. That is, when the master node obtains the update request of the target shared encoder sent by at least one child node, the shared encoder training instruction may be sent to each child node to trigger the training process of the target shared encoder, thereby achieving updating of the target shared encoder. The update request of the shared encoder sent by the child nodes may include an identifier of the target shared encoder, so that the master node may determine the type of the target shared encoder based on the identifier of the target shared encoder, and then send the shared encoder training instruction to child nodes based on the type of the target shared encoder.

As a possible implementation, the master node may also actively trigger the training process of the target shared encoder based on the updating rules. For example, in case that the updating rules are updating the target shared encoder at a preset frequency, the master node may send the shared encoder training instruction to child nodes at the preset frequency to trigger the training process of the target shared encoder.

It should be noted that the method for triggering the training process of the target shared encoder may include but is not limited to the situations listed above. In practical use, a suitable method for triggering the training process of the target shared encoder may be determined according to practical needs or specific application scenarios, which is not limited in the embodiment of the present application.

Step 102: after obtaining a confirmation message returned by each child node, an initial parameter set of the target shared encoder to be trained is sent to each child node, so that the initial parameter set is trained by each child node with the training samples.

In the embodiment of the present application, after the master node sends the shared encoder training instruction to child nodes, each child node may determine whether to engage in the training of the target shared encoder according to its own requirements for the target shared encoder or whether there are training samples that match the type of the target shared encoder. In case that child nodes may join the training of the target shared encoder, a confirmation message may be returned to the master node; in case that child nodes may not join the training of the target shared encoder, a confirmation message is not returned to the master node.

Therefore, when the master node obtains the confirmation message returned by the child node, it may determine the child nodes engaging in the training of the target shared encoder (that is, the child nodes that return the confirmation message), and obtain and send the initial parameter set of the target shared encoder to the child nodes engaging in the training of the target shared encoder, so that each child node may train the initial parameter set of the target shared encoder with its own training samples.

As a possible implementation, after the master node obtains the confirmation message returned by the child nodes, it may also send a preset executable program and the initial parameter set of the target shared encoder to be trained to the child nodes engaging in the training of the target shared encoder, so that each child node engaging in the training of the target shared encoder may train the target shared encoder based on the executable program.

It should be noted that the executable program sent by the master node to child nodes may include rules of training the target shared encoder for the child nodes, rules for returning the updated parameter set of the target shared encoder, and so on. For example, the executable program may include times of training the target shared encoder by the child nodes every time the training instruction sent by the master node is obtained, or may also include a time period for returning the updated parameter set of the target shared encoder from child nodes to the master node every time the training instruction sent by the master node is obtained, or the like, which is not limited in the embodiment of the present application.

Further, before training the target shared encoder, the master node needs to determine the initial parameter set corresponding to the target shared encoder. That is, in a possible implementation of the embodiment of the present application, it may further include before the above step 102:

generating the target shared encoder to be trained according to a second preset rule.

The second preset rule refers to a preset rule for obtaining the initial parameter set of the target shared encoder to be trained, and the second preset rule may be modified according to practical needs.

As a possible implementation, the second preset rule may be "predefined by each child node", the master node may obtain from child nodes in advance the initial parameter set of the target shared encoder predefined by each child node, and the initial parameter set of the target shared encoder is defined by each child node through negotiation, so the initial parameter set predefined by each child node is identical.

As a possible implementation, the second preset rule may also be "determined based on the parameter set for the same type of encoder that exists in the public model", and the master node may obtain from the public model the same type of encoder as the target shared encoder, and the parameter set of the obtained encoder is then determined as the initial parameter set of the target shared encoder.

Step 103: an updated parameter set of the target shared encoder returned by each child node is obtained.

In the embodiment of the present application, after the master node sends the initial parameter set of the target shared encoder to be trained to child nodes, it may obtain in real time the updated parameter set of the target shared encoder returned by each child node, wherein each child node uses its own training samples and trains the initial parameter set of the target shared encoder to obtain the updated parameter set of the target shared encoder returned by each child node.

Step 104: a target parameter set corresponding to the target shared encoder is determined based on a first preset rule and the updated parameter set of the target shared encoder returned by each child node.

The first preset rule herein refers to a preset rule for fusing the updated parameters of the target shared encoder returned by each child node to obtain a target parameter set corresponding to the target shared encoder. For example, the first preset rule may be that the mean value for parameters in the updated parameter set returned by child nodes is determined as a value for the corresponding parameter in the target parameter set, or may also be that the variance, standard deviation, median, etc. of parameters in the updated parameter set returned by child nodes is determined as a value for the corresponding parameter in the target parameter set.

It should be noted that the first preset rule may include but is not limited to the situations listed above. In practical use, it may be preset and modified in real time according to practical needs to adapt to current usage requirements and application scenarios, which is not limited in the embodiment of the present application.

In the embodiment of the present application, after the master node obtains the updated parameter set of the target shared encoder returned by each child node, it may fuse the obtained updated parameter sets according to the first preset rule to determine the target parameter set corresponding to the target shared code.

For example, the first preset rule is that "the mean value for parameters in the updated parameter set returned by child nodes is determined as a value for the corresponding parameter in the target parameter set", assuming that the current federated learning system has 3 child nodes (X, Y and Z), the parameter set of the target shared encoder includes 3 parameters, the updated parameter set of the target shared encoder returned by the child node X is $\{a_1, b_1, c_1\}$, the updated parameter set of the target shared encoder returned by the child node Y is $\{a_2, b_2, c_2\}$, and the updated parameter set of the target shared encoder returned by the child node Z is $\{a_3, b_3, c_3\}$, then the target parameter set corresponding to the target shared encoder is $\{a, b, c\}$, where $a=(a_1+a_2+a_3)/3$, $b=(b_1+b_2+b_3)/3$ and $c=(c_1+c_2+c_3)/3$.

According to the technical solution of the embodiment of the present application, the master node sends a shared encoder training instruction to child nodes, so that each child node obtains training samples based on a type of a target shared encoder included in the training instruction; after obtaining a confirmation message returned by each child node, an initial parameter set of the target shared encoder to be trained is sent to each child node, so that the initial parameter set is trained by each child node with its own training samples; an updated parameter set of the target shared encoder returned by each child node is then obtained; and a target parameter set corresponding to the target shared encoder is determined based on a first preset rule and the updated parameter set of the target shared encoder returned by each child node. As a result, the target shared encoder is trained with private training samples of each child node organized by the master node, so that the target parameter set of the target shared encoder is determined based on the training result of each child node on the target shared encoder. Thereby, training corpus from a plurality of fields is shared, the difficulty and cost of obtaining the training corpus from a plurality of fields is reduced and the performance of the shared encoder is improved.

In a possible implementation of the present application, in order to further improve the performance of the shared encoder finally obtained and to balance the importance of each child node in the training process of the shared encoder, different weights to each child node are determined based on a number of training samples of the child nodes.

The method for generating the shared encoder according to an embodiment of the present application will be further described below in conjunction with FIG. 2.

Figure 2:
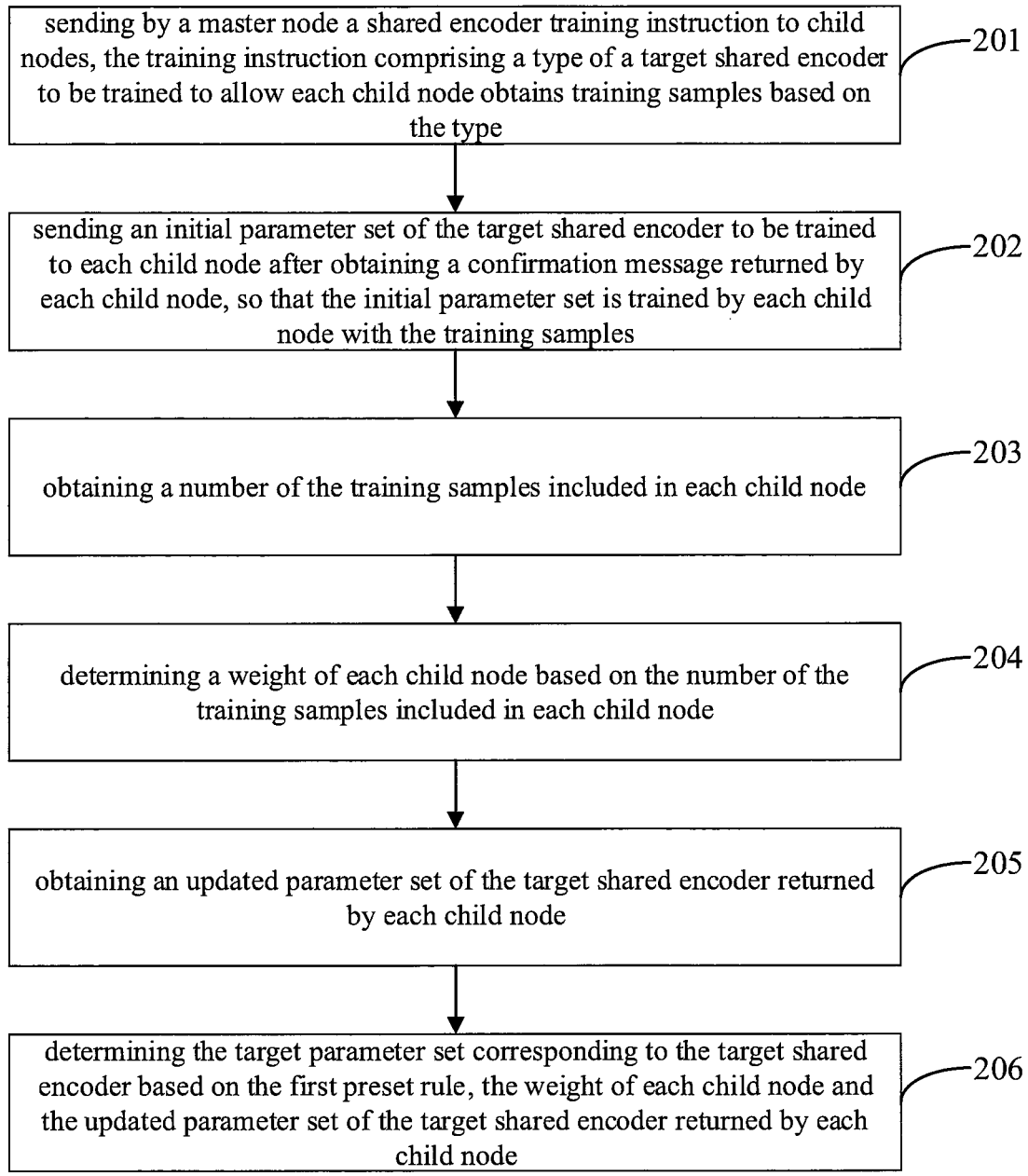
FIG. 2 is a schematic flowchart of another method for generating a shared encoder according to an embodiment of the present application.

FIG. 2 is a schematic flowchart of another method for generating a shared encoder according to an embodiment of the application, and the method is applied to a master node.

As shown in FIG. 2, the method for generating the shared encoder includes the following steps:

Step 201: a master node sends a shared encoder training instruction including a type of a target shared encoder to be trained to child nodes, to allow each child node obtains training samples based on the type.

Step 202: after obtaining a confirmation message returned by each child node, an initial parameter set of the target shared encoder to be trained is sent to each child node, so that the initial parameter set is trained by each child node with the training samples.

For the specific implementation process and principles of the above steps 201-202, reference may be made to the detailed description of the above embodiment, which will not be repeated here.

Step 203: a number of the training samples included in each child node is obtained.

The number of training samples included in the child nodes may refer to the number of training samples included in the child node that may be used to train the target shared encoder.

As a possible implementation, the master node may determine a weight of each child node when training the target shared encoder the number of training samples included in the child node that may be used to train the target shared encoder. Therefore, after the master node sends the initial parameter set of the target shared encoder to be trained to child nodes, the number of training samples included in the child node that may be used to train the target shared encoder may be obtained in real time.

Step 204: a weight of each child node is determined based on the number of the training samples included in each child node.

In the embodiment of the present application, since the number of training samples included in the child nodes is larger, the performance of the determined target shared encoder is better based on the updated parameter set returned by the child nodes, so that the master node may determine the weight of each child node based on the number of the training samples included in each child node As a possible implementation, the weight of a child node may be directly proportional to the number of the training samples included in the child nodes, that is, the more training samples the child node includes, the greater the weight of this child node, so that the child node with a greater number of training samples plays a greater role in training the target shared encoder to improve the performance of the target shared encoder finally obtained.

For example, a ratio between the number of training samples included in each child node and the number of training samples included in all child nodes may be determined as the weight of each child node. For example, the current federated learning system has 3 child nodes (X, Y, and Z), the number of training samples included in the child node X is m, the number of training samples included in the child node Y is n, and the number of training samples included in the child node Z is k, then the weight of child node X is $m/(m+n+k)$, the weight of child node Y is $n/(m+n+k)$, and the weight of child node Z is $k/(m+n+k)$.

Step 205: an updated parameter set of the target shared encoder returned by each child node is obtained.

For the specific implementation process and principle of the above step 205, reference may be made to the detailed description of the above embodiment, which will not be repeated here.

Step 206: the target parameter set corresponding to the target shared encoder is determined based on the first preset rule, the weight of each child node, and the updated parameter set of the target shared encoder returned by each child node.

In the embodiment of the present application, after the weight of each child node is determined and the updated parameter set of the target shared encoder returned by each child node is obtained, the updated parameter sets of the target shared encoder returned by child nodes may be fused based on the first preset rule and the weight of each child node, to determine the target parameter set corresponding to the target shared encoder.

As a possible implementation, the updated parameter set of the target shared encoder returned by each child node may be first modified based on the weight of each child node. That is, a product of the weight of each child node and the corresponding parameter in the updated parameter set is determined as a value for each parameter in the updated parameter set of each child node after modification. Hereafter, the updated parameter set of child nodes after modification are fused based on the first preset rule, to determine the target parameter set corresponding to the target shared encoder.

For example, the first preset rule is that "the mean value for parameters in the updated parameter set returned by child nodes is determined as a value for the corresponding parameter in the target parameter set", The current federated learning system has three child nodes (X, Y and Z), the weight of child node X is $w_1$ and the updated parameter set of the target shared encoder returned thereby is $\{a_1, b_1, c_1\}$, the weight of child node Y is $w_2$ and the updated parameter set of the target shared encoder returned thereby is $\{a_2, b_2, c_2\}$, the weight of child node Z is $w_3$ and the updated parameter set of the target shared encoder returned thereby is $\{a_3, b_3, c_3\}$, then the updated parameter set of child node X after modification is $\{w_1 \cdot a_1, w_1 \cdot b_1, w_1 \cdot c_1\}$, the updated parameter set of child node Y after modification is $\{w_2 \cdot a_2, w_2 \cdot b_2, w_2 \cdot c_2\}$, and the updated parameter set of child node Z after modification is $\{w_3 \cdot a_3, w_3 \cdot b_3, w_3 \cdot c_3\}$, the target parameter set corresponding to the target shared encoder is $\{a, b, c\}$, where $a=(w_1 \cdot a_1+w_2 \cdot a_2+w_3 \cdot a_3)/3$, $b=(w_1 \cdot b_1+w_2 \cdot b_2+w_3 \cdot b_3)/3$ and $c=(w_1 \cdot c_1+w_2 \cdot c_2+w_3 \cdot c_3)/3$.

According to the technical solution of the embodiment of the present application, the master node sends a shared encoder training instruction to child nodes, so that each child node obtains training samples based on based on a type of a target shared encoder included in the training instruction, and when each child node is obtained; after obtaining a confirmation message returned by each child node, an initial parameter set of the target shared encoder to be trained is sent to each child node, so that the initial parameter set is trained by each child node with its own training samples; a weight of each child node is determined based on the obtained number of the training samples included in each child node; an updated parameter set of the target shared encoder returned by each child node is then obtained; and a target parameter set corresponding to the target shared encoder is determined based on the first preset rule, the weight of each child node and the updated parameter set of the target shared encoder returned by each child node. As a result, the target shared encoder is trained with private training samples of each child node organized by the master node, and the weight of each child node is adjusted based on the number of training samples included in each child node. Thereby, training corpus from a plurality of fields is shared, the difficulty and cost of obtaining the training corpus from a plurality of fields is reduced and the performance of the shared encoder is improved.

In a possible implementation of the present application, in order to further improve the reliability and robustness of the shared encoder, the master node may determine whether the shared encoder meets the performance requirements based on the target parameter set obtained in the previous training process. In case that the shared encoder meets the performance requirements, the shared encoder may be retrained based on the previous training.

The method for generating the shared encoder according to an embodiment of the present application will be further described below in conjunction with FIG. 3.

Figure 3:
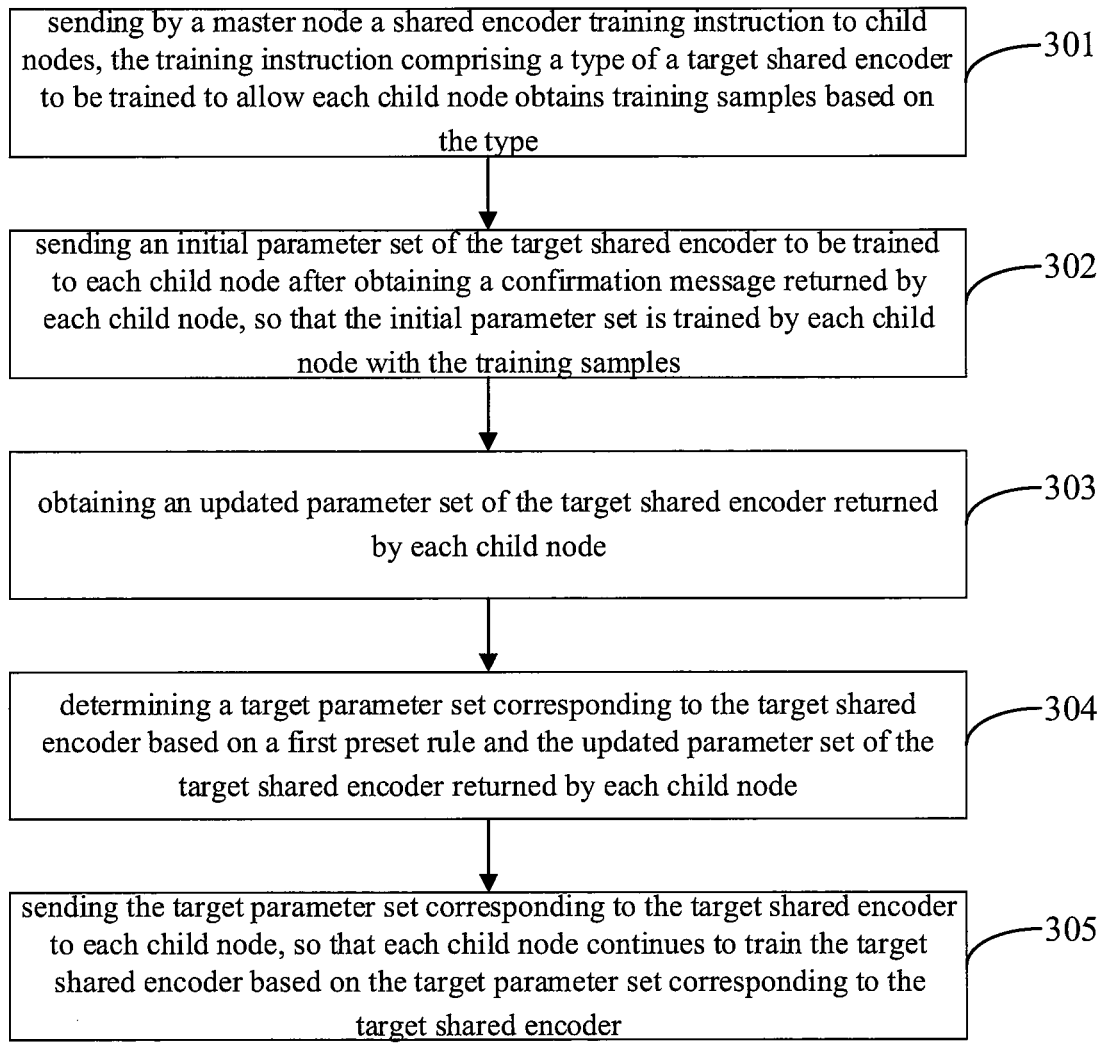
FIG. 3 is a schematic flowchart of yet another method for generating a shared encoder according to an embodiment of the present application.

FIG. 3 is a schematic flowchart of yet another method for generating a shared encoder according to an embodiment of the application, and the method is applied to a master node.

As shown in FIG. 3, the method for generating the shared encoder includes the following steps:

Step 301, a master node sends a shared encoder training instruction including a type of a target shared encoder to be trained to child nodes, to allow each child node obtains training samples based on the type.

Step 302: after obtaining a confirmation message returned by each child node, an initial parameter set of the target shared encoder to be trained is sent to each child node, so that the initial parameter set is trained by each child node with the training samples.

Step 303: an updated parameter set of the target shared encoder returned by each child node is obtained.

Step 304: a target parameter set corresponding to the target shared encoder is determined based on a first preset rule and the updated parameter set of the target shared encoder returned by each child node.

For the specific implementation process and principles of the above steps 301 to 304, reference may be made to the detailed description of the foregoing embodiment, which will not be repeated here.

Step 305: the target parameter set corresponding to the target shared encoder is send to each child node, so that each child node continues to train the target shared encoder based on the target parameter set corresponding to the target shared encoder.

In the embodiment of the present application, the master node may determine whether the target shared encoder meets the performance requirements every time the target parameter set corresponding to the target shared encoder is determined. In case that the target shared encoder meets the performance requirements, it may be determined that the training of the target shared encoder for this round is completed; and in case that the target shared encoder does not meet the performance requirements, it may be determined that the training of the target shared encoder for further round is required to improve the performance of the target shared encoder.

Therefore, after determining that the target parameter set corresponding to the target shared encoder does not meet the performance requirements, the master node may send the target parameter set corresponding to the target shared encoder to child nodes, so that each child node may continue to train the target shared encoder with its own training samples based on the target parameter set corresponding to the target shared encoder, until the master node determines the target parameter set corresponding to the target shared encoder meets the performance requirements based on the updated parameter set returned by each child node again, then the target parameter set corresponding to the target shared encoder will be no longer sent to each child node. That is, the training of the target shared encoder for this round is completed.

Further, when the target shared encoder is trained for a plurality of times, the weight of each child node may be determined based on the times of each child node training the target shared encoder, to balance the role of each child node in the training process of the target shared encoder. That is, in a possible implementation of the embodiment of the present application, it may further include after the above step 305:

obtaining a parameter set of the target shared encoder returned by a first child node again;

determining a current weight value for the first child node based on times of the first child node returning the parameter set of the target shared encoder; and updating the target parameter set corresponding to the target shared encoder based on the current weight value for the first child node and the parameter set of the target shared encoder currently returned by the first child node according to the first preset rule.

The first child node herein refers to a child node from the plurality of child nodes that engages in the training of the target shared encoder for a plurality of times.

As a possible implementation, when the master node obtains a parameter set of the target shared encoder returned by a first child node again, the obtained times of the first child node returning the parameter set of the target shared encoder (i.e., the times of the first child node engaging in the training of the target shared encoder) are determined, and a current weight value for the first child node is determined based on the times of the first child node returning the parameter set of the target shared encoder.

Alternatively, since the child node engages in the training of the target shared encoder more times, the parameter set of the target shared encoder returned by the child node has a greater impact on the target parameter set corresponding to the final target shared encoder. As a result, the target shared encoder finally obtained is so well fit to the characteristics of the training samples of the child node that the universality of the target shared encoder becomes poor. Therefore, in a possible implementation of the embodiment of the present application, the current weight value for the first child node may have a negative correlation with the times of the first child node returning the parameter set of the target shared encoder.

In the embodiment of the present application, since each child node may return the parameter set of the target shared encoder at a different moment, the current weight value for the first child node is determined every time one parameter set of the target shared encoder returned by the first child node again is obtained. Further, the master node modifies the parameter set of the target shared encoder returned by the first child node again based on the current weight value for the first child node. The modified parameter set of the target shared encoder returned by the first child node again is fused with the previously determined target parameter set corresponding to the target shared encoder based on the first preset rule, so as to update the target parameter set corresponding to the target shared encoder.

For example, the first preset rule is that "a sum of parameters in the updated parameter set returned by child nodes is determined as a value for the corresponding parameter in the target parameter set", the previously determined target parameter set corresponding to the target shared encoder by the master node is {a, b, c}, the currently obtained parameter set of the target shared encoder returned by the first child node X again that is $\{a_x, b_x, c_x\}$, the weight value for the first child node X is determined as $w_x$ based on times of the first child node X returning the parameter set of the target shared encoder, then the modified parameter set of the target shared encoder returned by the first child node X again may be determined to be $\{w_x \cdot a_x, w_x \cdot b_x, w_x \cdot c_x\}$ and the updated target parameter set corresponding to the target shared encoder may be determined to be $\{a+w_x \cdot a_x, b+w_x \cdot b_x, c+w_x \cdot c_x\}$.

According to the technical solution of the embodiment of the present application, the master node sends a shared encoder training instruction to each child node, so that each child node obtains training samples based on a type of a target shared encoder included in the training instruction; after obtaining a confirmation message returned by each child node, an initial parameter set of the target shared encoder to be trained is sent to each child node, so that the initial parameter set is trained by each child node with its own training samples; an updated parameter set of the target shared encoder returned by each child node is then obtained; a target parameter set corresponding to the target shared encoder is determined based on a first preset rule and the updated parameter set of the target shared encoder returned by each child node; and the target parameter set corresponding to the target shared encoder is send to each child node, so that each child node continues to train the target shared encoder based on the target parameter set corresponding to the target shared encoder. As a result, the target shared encoder is trained for a plurality of times with private training samples of each child node organized by the master node, so that the target parameter set of the target shared encoder is determined based on the plurality of training results of each child node on the target shared encoder. Thereby, training corpus from a plurality of fields is shared, the difficulty and cost of obtaining the training corpus from a plurality of fields is reduced and the performance of the shared encoder is improved.

The following takes the child node side as an example to describe in detail the method for generating the shared encoder according to the embodiment of the present application.

The method for generating the shared encoder according to an embodiment of the present application will be further described below in conjunction with FIG. 4.

Figure 4:
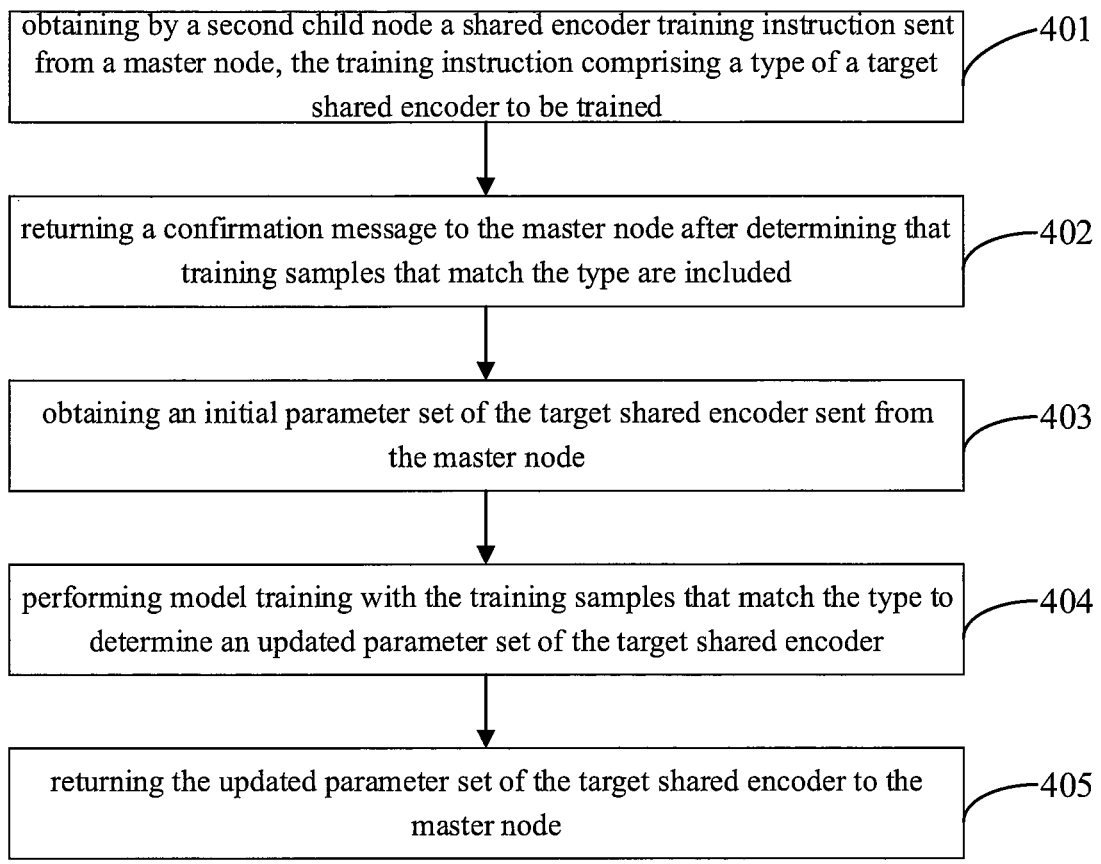
FIG. 4 is a schematic flowchart of yet another method for generating a shared encoder according to an embodiment of the present application.

FIG. 4 is a schematic flowchart of yet another method for generating a shared encoder according to an embodiment of the application, and the method is applied to a child node.

As shown in FIG. 4, the method for generating the shared encoder includes the following steps:

Step 401: a second child node obtains a shared encoder training instruction sent by a master node, the training instruction including a type of a target shared encoder to be trained.

The master node herein refers to a node configured to trigger the training process of the shared encoder. For example, when the method for generating the shared encoder of the embodiment of the present application is applied to a federated learning system, the master node may be a server of the federated learning system.

The child node herein refers to a node configured to engage in training the shared encoder with their own training samples. For example, the child node may be a server of the company or organization that engage in training the shared encoder when training the model. A second child node refers to one of a plurality of child nodes.

In practical use, the method for generating the shared encoder in the embodiment of the present application may be applied to any scenario where a co-training is performed, which is not limited in the embodiment of the present application. The application scenario where the method for generating the shared encoder of the embodiment of the present application is applied to a federated learning system is taken as an example for detailed descriptions below.

In the embodiment of the present application, the second child node may obtain in real time a shared encoder training instruction that is sent from a master node to child nodes when there is a need to train the shared encoder. When the second child node obtains the shared encoder training instruction, it is determined whether to join the training of the target shared encoder based on a type of a target shared encoder to be trained included in the training instruction.

Step 402: after determining that training samples that match the type are included, a confirmation message is returned to the master node.

In the embodiment of the present application, in case that the second child node determines that it includes training samples that match the type of the target shared encoder, it may be determined to join the training of the target shared encoder, so that a confirmation message may be returned to the master node, the master node determines the child nodes engaging in the training of the target shared encoder based on the obtained confirmation message, obtains the initial parameter set of the target shared encoder to be trained and sends the same to the second child node.

Step 403: an initial parameter set of the target shared encoder sent by the master node is obtained.

In the embodiment of the present application, after the second child node returns the confirmation message to the master node, it may obtain in real time the initial parameter set of the target shared encoder returned by the master node, so as to train the target shared encoder based on the initial parameter set of the target shared encoder.

Step 404: model training is performed with the training samples that match the type of the target shared encoder to determine an updated parameter set of the target shared encoder.

In the embodiment of the present application, after the second child node obtains the initial parameter set of the target shared encoder, model training may be performed with the training samples that match the type of the target shared encoder and the obtained initial parameter set of the target shared encoder, to determine an updated parameter set of the target shared encoder.

Step 405: the updated parameter set of the target shared encoder is returned to the master node.

In the embodiment of the present application, after the second child node completes the training of the target shared encoder, it may return the determined updated parameter set of the target shared encoder to the master node so that the master node may determine he target parameter set corresponding to the target shared encoder based on the returned updated parameter set.

Further, in order to further improve the performance of the shared encoder finally obtained and to balance the importance of each child node in the training process of the shared encoder, the master node may also determine different weights to each child node based on a number of training samples of the child nodes. That is, in a possible implementation of the embodiment of the present application, the above method may further include:

sending the number of training samples that match the type of the target shared encoder to the master node.

As a possible implementation, the master node may determine the weight of the second child node when training the target shared encoder based on the number of training samples that the second child node includes and that may be used to train the target shared encoder (i.e., the number of training samples that match the type of the target shared encoder). Therefore, the second child node may send the number of training samples that match the type of the target shared encoder to the master node, so that the master node may determine the weight of the second child node based on the number of training samples that match the type of the target shared encoder included in the second child node.

Further, the child nodes may also design a private encoder and a private decoder based on private training samples, and determine the shared encoder training tasks that may join based on the designed private encoder and private decoder. That is, in a possible implementation of the embodiment of the present application, it may further include after the above step 405:

determining a private encoder and a private decoder corresponding to the target shared encoder.

In a possible implementation of the embodiment of the present application, the second child node may design a private encoder and a private decoder based on the included training samples, and may obtain the private encoder and private decoder corresponding to the target shared encoder after training the target shared encoder with the training samples that match the type of the target shared encoder. The updated parameter set of the target shared encoder is jointly determined based on the training result of the target shared encoder as well as the private encoder and private decoder corresponding to the target shared encoder.

According to the technical solution of the embodiment of the present application, a second child node obtains a shared encoder training instruction sent by a master node, the training instruction including a type of a target shared encoder to be trained; after determining that training samples that match the type are included, a confirmation message is returned to the master node; an initial parameter set of the target shared encoder sent by the master node is obtained; and model training is performed with the training samples that match the type of the target shared encoder to determine an updated parameter set of the target shared encoder. As a result, the target shared encoder is trained with private training samples of each child node organized by the master node, so that the target parameter set of the target shared encoder is determined based on the training result of each child node on the target shared encoder. Thereby, training corpus from a plurality of fields is shared, the difficulty and cost of obtaining the training corpus from a plurality of fields is reduced and the performance of the shared encoder is improved.

In a possible implementation of the present application, the child node may return the updated parameter set of the target shared encoder to the master node based on the updating rules preset by the master node.

The method for generating the shared encoder according to an embodiment of the present application will be further described below in conjunction with FIG. 5.

Figure 5:
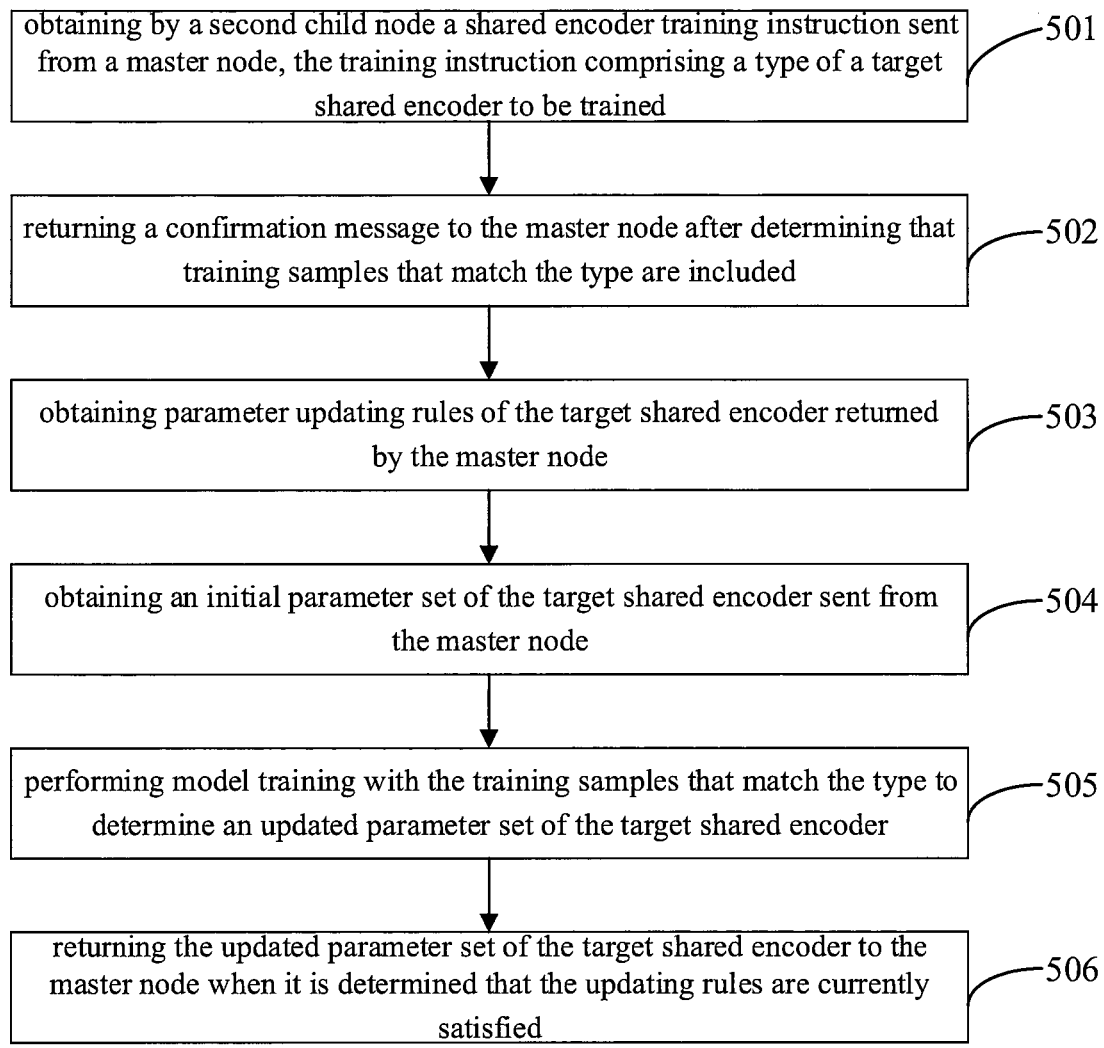
FIG. 5 is a schematic flowchart of yet another method for generating a shared encoder according to an embodiment of the present application.

FIG. 5 is a schematic flowchart of another method for generating a shared encoder according to an embodiment of the application, and the method is applied to a child node.

As shown in FIG. 5, the method for generating the shared encoder includes the following steps:

Step 501: a second child node obtains a shared encoder training instruction sent by a master node, the training instruction including a type of a target shared encoder to be trained.

Step 502: after determining that training samples that match the type are included, a confirmation message is returned to the master node.

For the specific process and principles of implementing the above steps 501 to 502, reference may be made to the detailed description of the above embodiment, which will not be repeated here.

Step 503: parameter updating rules of the target shared encoder returned by the master node are obtained.

The parameter updating rules of the target shared encoder may be included in the executable program returned by the master node.

As a possible implementation, after the master node obtains the confirmation message returned by the child node, it may also send a preset executable program to the child nodes that engage in training the target shared encoder, so that the second child node may train the target shared encoder based on the executable program and decide whether the determined updated parameter set may be returned to the master node based on parameter updating rules of the target shared encoder included in the executable program.

It should be noted that, the parameter updating rules of the target shared encoder may be times of training the target shared encoder by the second child node every time the training instruction sent by the master node is obtained, or may also be a time period for returning the updated parameter set of the target shared encoder from the second child node to the master node every time the training instruction sent by the master node is obtained, or the like, which is not limited in the embodiment of the present application.

For example, the parameter updating rules of the target shared encoder may be "the updated parameter set of the target shared code is obtained and returned to the master node after training on the target shared encoder for 5 rounds", or may also be "the updated parameter set of the target shared code is returned to the master node for every month".

Step 504: an initial parameter set of the target shared encoder sent by the master node is obtained.

Step 505: model training is performed with the training samples that match the type of the target shared encoder to determine an updated parameter set of the target shared encoder.

For the specific implementation process and principles of the above steps 504 to 505, reference may be made to the detailed description of the above embodiment, which will not be repeated here.

Step 506: when it is determined that the updating rules are currently met, the updated parameter set of the target shared encoder is returned to the master node.

In the embodiment of the present application, every time the second child node completes training on the target shared encoder for one round, it may be determined whether the parameter updating rules of the target shared encoder is currently met. If the parameter updating rules of the target shared encoder are currently met, the updated parameter set of the target shared encoder that is currently obtained may be returned to the master node; if the parameter updating rules of the target shared encoder are not currently met, the next round of training is continued on the target shared encoder until the parameter updating rules of the target shared encoder are currently met.

For example, the updating rule of the target shared encoder parameter is that "the updated parameter set of the target shared encoder is returned to the master node every time the child node completes 5 rounds of training the target shared encoder". In case that the second child node currently completes the fourth round of training the target shared encoder, it may be determined that the updating rules of the target shared encoder parameter are not met currently and the next round of training the target shared encoder may be continued; and in case that the second child node currently completes the fifth round of training the target shared encoder, it may be determined that the updating rule of the target shared encoder parameter is currently met, and the updated parameter set of the target shared encoder obtained after the fifth round of training may be returned to the master node.

According to the technical solution of the embodiment of the present application, a second child node obtains a shared encoder training instruction sent by a master node, the training instruction including a type of a target shared encoder to be trained; after determining that training samples that match the type are included, a confirmation message is returned to the master node; it is obtained that parameter updating rules of the target shared encoder returned by the master node and an initial parameter set of the target shared encoder sent by the master node; model training is performed with the training samples that match the type of the target shared encoder to determine an updated parameter set of the target shared encoder; and when it is determined that the updating rules are currently met, the updated parameter set of the target shared encoder is returned to the master node. As a result, the target shared encoder is trained with private training samples of each child node organized by the master node, and it is determined based on parameter updating rules of the target shared encoder returned by the master node when the child node returns the target parameter set of the target shared encoder to the master node. Thereby, training corpus from a plurality of fields is shared, the difficulty and cost of obtaining the training corpus from a plurality of fields is reduced and the performance of the shared encoder is improved.

In order to implement the above embodiments, an apparatus for generating a shared encoder is provided in the present application.

Figure 6:
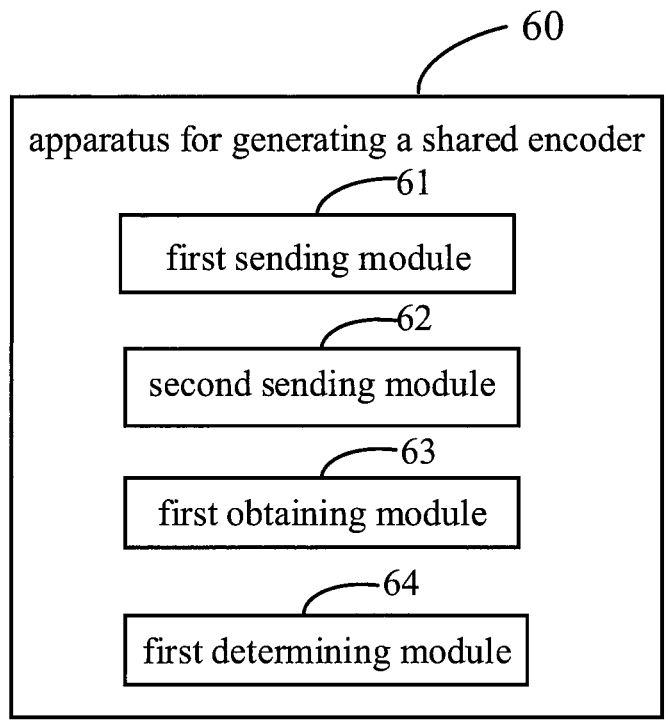
FIG. 6 is a structural schematic diagram of an apparatus for generating a shared encoder according to an embodiment of the present application.

FIG. 6 is a structural schematic diagram of an apparatus for generating a shared encoder according to an embodiment of the application, and the apparatus is applied to a master node.

As shown in FIG. 6, the apparatus 60 for generating a shared includes:

a first sending module 61, configured to send by a master node a shared encoder training instruction comprising a type of a target shared encoder to be trained to child nodes, to allow each child node obtains training samples based on the type;

a second sending module 62, configured to send an initial parameter set of the target shared encoder to be trained to each child node after obtaining a confirmation message returned by each child node, so that the initial parameter set is trained by each child node with the training samples;

a first obtaining module 63, configured to obtain an updated parameter set of the target shared encoder returned by each child node; and a first determining module 64, configured to determine a target parameter set corresponding to the target shared encoder based on a first preset rule and the updated parameter set of the target shared encoder returned by each child node.

In practical use, the apparatus for generating a shared encoder according to the embodiment of the present application may be configured in any electronic device to perform the foregoing methods for generating the shared encoder.

According to the technical solution of the embodiment of the present application, the master node sends a shared encoder training instruction to each child node, so that each child node obtains training samples based on a type of a target shared encoder included in the training instruction; after obtaining a confirmation message returned by each child node, an initial parameter set of the target shared encoder to be trained is sent to each child node, so that the initial parameter set is trained by each child node with its own training samples; an updated parameter set of the target shared encoder returned by each child node is then obtained; and a target parameter set corresponding to the target shared encoder is determined based on a first preset rule and the updated parameter set of the target shared encoder returned by each child node. As a result, the target shared encoder is trained with private training samples of each child node organized by the master node, so that the target parameter set of the target shared encoder is determined based on the training result of each child node on the target shared encoder. Thereby, training corpus from a plurality of fields is shared, the difficulty and cost of obtaining the training corpus from a plurality of fields is reduced and the performance of the shared encoder is improved.

In a possible implementation of the present application, the above apparatus 60 for generating the shared encoder further includes:

a second obtaining module, configured to obtain by the master node a request for obtaining the target shared encoder sent by at least one child node;

or,
a third obtaining module, configured to obtain by the master node an update request of the target shared encoder sent by at least one child node, the update request comprising an identifier of the target shared encoder.

Further, in another possible implementation of the present application, the above apparatus 60 for generating the shared encoder further includes:

a fourth obtaining module, configured to obtain a number of the training samples included in each child node;

a second determining module, configured to determine a weight of each child node based on the number of the training samples included in each child node;

correspondingly, the first determining module 64 is specifically configured to:

determine the target parameter set corresponding to the target shared encoder based on the first preset rule, the weight of each child node and the updated parameter set of the target shared encoder returned by each child node.

Further, in another possible implementation of the present application, the above apparatus 60 for generating a shared encoder further includes:

a third sending module, configured to send the target parameter set corresponding to the target shared encoder to each child node, so that each child node continues to train the target shared encoder based on the target parameter set corresponding to the target shared encoder.

Further, in yet another possible implementation of the present application, the above apparatus 60 for generating a shared encoder further includes:

a fifth obtaining module, configured to obtain a parameter set of the target shared encoder returned by a first child node again;

a third determining module, configured to determine a current weight value for the first child node based on times of the first child node returning the parameter set of the target shared encoder; and an updating module, configured to update the target parameter set corresponding to the target shared encoder based on the current weight value for the first child node and the parameter set of the target shared encoder currently returned by the first child node according to the first preset rule.

Further, in yet another possible implementation of the present application, the above apparatus 60 for generating a shared encoder further includes:

a generating module, configured to generate the target shared encoder to be trained according to a second preset rule.

It should be noted that, the explanation of the method for generating the shared encoder shown in FIG. 1, FIG. 2 and FIG. 3 in the foregoing embodiments are also applied to the apparatus 60 for generating the shared encoder in this embodiment, which will not be repeated again.

According to the technical solution of the embodiment of the present application, the master node sends a shared encoder training instruction to each child node, so that each child node obtains training samples based on a type of a target shared encoder included in the training instruction; after obtaining a confirmation message returned by each child node, an initial parameter set of the target shared encoder to be trained is sent to each child node, so that the initial parameter set is trained by each child node with its own training samples; an updated parameter set of the target shared encoder returned by each child node is then obtained; a target parameter set corresponding to the target shared encoder is determined based on a first preset rule and the updated parameter set of the target shared encoder returned by each child node; and the target parameter set corresponding to the target shared encoder is sent to each child node, so that each child node continues to train the target shared encoder based on the target parameter set corresponding to the target shared encoder. As a result, the target shared encoder is trained for a plurality of times with private training samples of each child node organized by the master node, so that the target parameter set of the target shared encoder is determined based on the plurality of training results of each child node on the target shared encoder. Thereby, training corpus from a plurality of fields is shared, the difficulty and cost of obtaining the training corpus from a plurality of fields is reduced and the accuracy and universality of the shared encoder is improved.

In order to implement the above embodiments, another apparatus for generating a shared encoder is provided in the present application.

Figure 7:
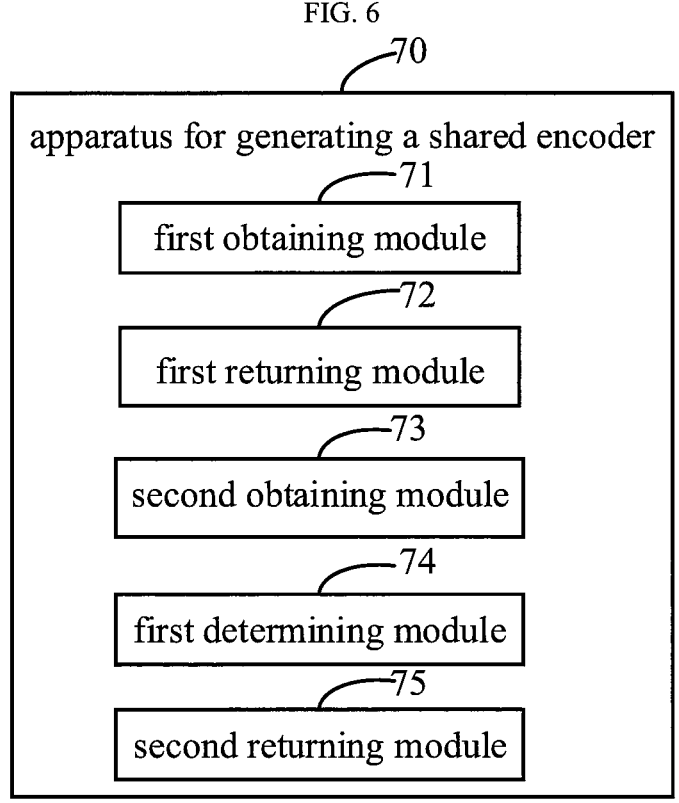
FIG. 7 is a structural schematic diagram of another apparatus for generating a shared encoder according to an embodiment of the present application.

FIG. 7 is a structural schematic diagram of another apparatus for generating a shared encoder according to an embodiment of the present application, and the apparatus is applied to a child node.

As shown in FIG. 7, the apparatus 70 for generating the shared encoder includes:

a first obtaining module 71, configured to obtain by a second child node a shared encoder training instruction sent from a master node, the training instruction comprising a type of a target shared encoder to be trained;

a first returning module 72, configured to return a confirmation message to the master node after determining that training samples that match the type are included;

a second obtaining module 73, configured to obtain an initial parameter set of the target shared encoder sent from the master node;

a first determining module 74, configured to perform model training with the training samples that match the type to determine an updated parameter set of the target shared encoder; and a second returning module 75, configured to return the updated parameter set of the target shared encoder to the master node.

In practical use, the apparatus for generating the shared encoder according to the embodiment of the present application may be configured in any electronic device to perform the foregoing methods for generating the shared encoder.

According to the technical solution of the embodiment of the present application, the second child node obtains a shared encoder training instruction sent from the master node; after determining that training samples that match the type of target shared encoder are included, a confirmation message is returned to the master node; an initial parameter set of the target shared encoder sent from the master node is obtained; model training is then performed with the training samples that match the type of target shared encoder to determine an updated parameter set of the target shared encoder; the updated parameter set of the target shared encoder is returned to the master node. As a result, the target shared encoder is trained with private training samples of each child node organized by the master node, so that the target parameter set of the target shared encoder is determined based on the training result of each child node on the target shared encoder. Thereby, training corpus from a plurality of fields is shared, the difficulty and cost of obtaining the training corpus from a plurality of fields is reduced and the performance of the shared encoder is improved.

In a possible implementation of the present application, the above apparatus 70 for generating the shared encoder further includes:

a third obtaining module, configured to obtain parameter updating rules of the target shared encoder returned by the master node;

correspondingly, the second returning module 75 is specifically configured to:

return the updated parameter set of the target shared encoder to the master node when it is determined that the updating rules are currently met.

Further, in another possible implementation of the present application, the above apparatus 70 for generating the shared encoder further includes:

a sending module, configured to send a number of training samples that match the type of the target shared encoder to the master node.

Further, in yet another possible implementation of the present application, the above apparatus 70 for generating the shared encoder further includes:

a second determining module, configured to determine a private encoder and a private decoder corresponding to the target shared encoder.

It should be noted that, the explanation of the method for generating the shared encoder shown in FIG. 4 and FIG. 5 in the foregoing embodiments are also applied to the apparatus 70 for generating the shared encoder in this embodiment, which will not be repeated again.

According to the technical solution of the embodiment of the present application, the second child node obtains a shared encoder training instruction sent from the master node; after determining that training samples that match the type of target shared encoder are included, a confirmation message is returned to the master node; parameter updating rules of the target shared encoder returned by the master node and an initial parameter set of the target shared encoder are obtained; model training is then performed with the training samples that match the type of target shared encoder to determine an updated parameter set of the target shared encoder; the updated parameter set of the target shared encoder is returned to the master node when it is determined that the updating rules are currently met. As a result, the target shared encoder is trained with private training samples of each child node organized by the master node, and it is determined based on parameter updating rules of the target shared encoder returned by the master node when the child node returns the target parameter set of the target shared encoder to the master node. Thereby, training corpus from a plurality of fields is shared, the difficulty and cost of obtaining the training corpus from a plurality of fields is reduced and the performance of the shared encoder is improved.

According to the embodiments of the present application, the present application also provides an electronic device and a readable storage medium.

Figure 8:
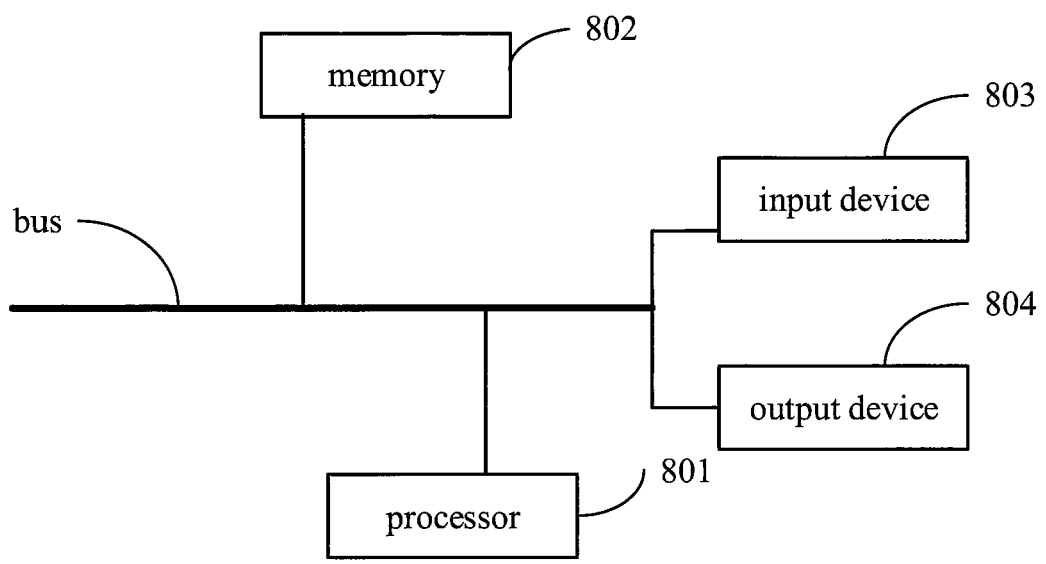
FIG. 8 is a structural schematic diagram of an electronic device according to an embodiment of the present application.

As shown in FIG. 8, it is a block diagram of an electronic device capable of implementing a method for generating a shared encoder according to embodiments of the present application. The electronic device aims to represent various forms of digital computers, such as a laptop computer, a desktop computer, a workstation, a personal digital assistant, a server, a blade server, a mainframe computer and other suitable computers. The electronic device may also represent various forms of mobile devices, such as a personal digital processing, a cellular phone, a smart phone, a wearable device and other similar computing devices. The components, connections and relationships of the components, and functions of the components illustrated herein are merely examples, and are not intended to limit the implementation of the present application described and/or claimed herein.

As shown in FIG. 8, the electronic device includes: one or more processors 608, a memory 608, and interfaces for connecting various components, including a high-speed interface and a low-speed interface. Various components are connected to each other by different buses, and may be mounted on a common main board or mounted in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each electronic device provides some necessary operations (for example, as a server array, a group of blade servers, or a multiprocessor system). In FIG. 8, a processor 801 is taken as an example.

The memory 802 is a non-transitory computer readable storage medium according to the present application. The memory 802 is configured to store instructions executable by at least one processor, to enable the at least one processor to execute a method for generating a shared encoder according to the present application. The non-transitory computer readable storage medium according to the present application is configured to store computer instructions. The computer instructions are configured to enable a computer to execute the method for generating the shared encoder according to the present application.

As the non-transitory computer readable storage medium, the memory 802 may be configured to store non-transitory software programs, non-transitory computer executable programs and modules, such as program instructions/modules (such as, the first sending module 61, the second sending module 62, the first obtaining module 63, the first determining module 64 illustrated in FIG. 6 and the first obtaining module 71, the first returning module 72, the second obtaining module 73, the first determining module 74 and the second returning module 75 as illustrated in FIG. 7) corresponding to the method for generating the shared encoder according to embodiments of the present application. The processor 801 executes various functional applications and data processing of the server by operating non-transitory software programs, instructions and modules stored in the memory 802, that is, implements the method for generating the shared encoder according to the above method embodiment.

The memory 802 may include a storage program region and a storage data region. The storage program region may store an application required by an operating system and at least one function. The storage data region may store data created according to usage of the electronic device for generating a shared encoder. In addition, the memory 802 may include a high-speed random access memory, and may also include a non-transitory memory, such as at least one disk memory device, a flash memory device, or other non-transitory solid-state memory devices. In some embodiments, the memory 802 may optionally include memories remotely located to the processor 801, and these remote memories may be connected to the electronic device capable of implementing the method for generating the shared encoder via a network. Examples of the above network include, but are not limited to, the Internet, an intranet, a local area network, a mobile communication network and combinations thereof.

The electronic device capable of implementing the method for generating the shared encoder may also include: an input device 803 and an output device 804. The processor 801, the memory 802, the input device 803, and the output device 804 may be connected through a bus or in other means. In FIG. 8, the bus is taken as an example.

The input device 803 may receive inputted digital or character information, and generate key signal input related to user setting and function control of the electronic device capable of generating the shared encoder, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

According to the technical solution of the embodiment of the present application, the master node sends a shared encoder training instruction to each child node, so that each child node obtains training samples based on a type of a target shared encoder included in the training instruction; after obtaining a confirmation message returned by each child node, an initial parameter set of the target shared encoder to be trained is sent to each child node, so that the initial parameter set is trained by each child node with its own training samples; an updated parameter set of the target shared encoder returned by each child node is then obtained; and a target parameter set corresponding to the target shared encoder is determined based on a first preset rule and the updated parameter set of the target shared encoder returned by each child node. As a result, the target shared encoder is trained with private training samples of each child node organized by the master node, so that the target parameter set of the target shared encoder is determined based on the training result of each child node on the target shared encoder. Thereby, training corpus from a plurality of fields is shared, the difficulty and cost of obtaining the training corpus from a plurality of fields is reduced and the performance of the shared encoder is improved.

It should be understood that, steps may be reordered, added or deleted by utilizing flows in the various forms illustrated above. For example, the steps described in the present application may be executed in parallel, sequentially or in different orders, so long as desired results of the technical solution disclosed in the present application may be achieved, there is no limitation here.

The above detailed implementations do not limit the protection scope of the present application. It should be understood by the skilled in the art that various modifications, combinations, sub-combinations and substitutions may be made based on design requirements and other factors. Any modification, equivalent substitution and improvement made within the spirit and the principle of the present application shall be included in the protection scope of present disclosure.

What is claimed is:

1. A method for generating a shared encoder, comprising:
   sending by a master node a shared encoder training instruction comprising a type of a target shared encoder to be trained to child nodes, to allow each child node obtains training samples based on the type;

sending an initial parameter set of the target shared encoder to be trained to each child node after obtaining a confirmation message returned by each child node, so that the initial parameter set is trained by each child node with the training samples;

obtaining a number of the training samples included in each child node;

determining a weight of each child node based on the number of the training samples included in each child node, wherein the weight is used to balance an importance of each child node in a training of the target shared encoder:

obtaining an updated parameter set of the target shared encoder returned by each child node; and determining a product of the weight of each child node and a corresponding parameter in the updated parameter set as a value for each parameter in an updated parameter set after modification, and determining a target parameter set corresponding to the target shared encoder by fusing the updated parameter set after modification of each child node based on a first preset rule.

2. The method according to claim 1, wherein before sending by the master node the shared encoder training instruction to the child nodes, further comprising:

obtaining by the master node a request for obtaining the target shared encoder sent by at least one child node.

3. The method according to claim 1, wherein before sending by the master node the shared encoder training instruction to the child nodes, further comprising:

obtaining by the master node an update request of the target shared encoder sent by at least one child node, the update request comprising an identifier of the target shared encoder.

4. The method according to claim 1, wherein after determining the target parameter set corresponding to the target shared encoder, further comprising:

sending the target parameter set corresponding to the target shared encoder to each child node, so that each child node continues to train the target shared encoder based on the target parameter set corresponding to the target shared encoder.

5. The method according to claim 4, wherein after sending the target parameter set corresponding to the target shared encoder to each child node, further comprising:

obtaining a parameter set of the target shared encoder returned by a first child node again;

determining a current weight value for the first child node based on times of the first child node returning the parameter set of the target shared encoder; and updating the target parameter set corresponding to the target shared encoder based on the current weight value for the first child node and the parameter set of the target shared encoder currently returned by the first child node according to the first preset rule.

6. The method according to claim 1, wherein before sending the initial parameter set of the target shared encoder to be trained to each child node, further comprising:

generating the target shared encoder to be trained according to a second preset rule.

7. A method for generating a shared encoder, comprising:

obtaining by a child node a shared encoder training instruction sent from a master node, the training instruction comprising a type of a target shared encoder to be trained;

returning a confirmation message to the master node after determining that training samples that match the type are included;

obtaining an initial parameter set of the target shared encoder sent from the master node;

sending a number of training samples that match the type of the target shared encoder to the master node;

performing model training with the training samples that match the type to determine an updated parameter set of the target shared encoder; and returning the updated parameter set of the target shared encoder to the master node, so that the master node determines a product of the weight of the child node and a corresponding parameter in the updated parameter set as a value for each parameter in an updated parameter set after modification, and determines a target parameter set corresponding to the target shared encoder by fusing the updated parameter set after modification of each child node based on a first preset rule.

8. The method according to claim 7, wherein after returning the confirmation message to the master node, further comprising:

obtaining parameter updating rules of the target shared encoder returned by the master node; and returning the updated parameter set of the target shared encoder to the master node comprises:

returning the updated parameter set of the target shared encoder to the master node when it is determined that the updating rules are currently met.

9. The method according to claim 7, wherein performing model training with the training samples that match the type, further comprising:

determining a private encoder and a private decoder corresponding to the target shared encoder.

10. An apparatus for generating a shared encoder, comprising: a non-transitory computer-readable medium including computer-executable instructions stored thereon, and an instruction execution system which is configured by the instructions to implement:

a first sending module, configured to send by a master node a shared encoder training instruction comprising a type of a target shared encoder to be trained to child nodes, to allow each child node obtains training samples based on the type;

a second sending module, configured to send an initial parameter set of the target shared encoder to be trained to each child node after obtaining a confirmation message returned by each child node, so that the initial parameter set is trained by each child node with the training samples;

a first obtaining module, configured to obtain an updated parameter set of the target shared encoder returned by each child node;

a fourth obtaining module, configured to obtain a number of the training samples included in each child node;

a second determining module, configured to determine a weight of each child node based on the number of the training samples included in each child node, wherein the weight is used to balance an importance of each child node in a training of the target shared encoder; and a first determining module, configured to determine a product of the weight of each child node and a corresponding parameter in the updated parameter set as a value for each parameter in an updated parameter set after modification, and determine a target parameter set corresponding to the target shared encoder by fusing the updated parameter set after modification of each child node based on a first preset rule.

11. The apparatus according to claim 10, wherein the instruction execution system is further configured by the instructions to implement:
a second obtaining module, configured to obtain by the master node a request for obtaining the target shared encoder sent by at least one child node.

12. The apparatus according to claim 10, wherein the instruction execution system is further configured by the instructions to implement:
a third obtaining module, configured to obtain by the master node an update request of the target shared encoder sent by at least one child node, the update request comprising an identifier of the target shared encoder.

13. The apparatus according to claim 10, wherein the instruction execution system is further configured by the instructions to implement:
a third sending module, configured to send the target parameter set corresponding to the target shared encoder to each child node, so that each child node continues to train the target shared encoder based on the target parameter set corresponding to the target shared encoder.

14. The apparatus according to claim 13, wherein the instruction execution system is further configured by the instructions to implement:
a fifth obtaining module, configured to obtain a parameter set of the target shared encoder returned by a first child node again;
a third determining module, configured to determine a current weight value for the first child node based on times of the first child node returning the parameter set of the target shared encoder; and
an updating module, configured to update the target parameter set corresponding to the target shared encoder based on the current weight value for the first child node and the parameter set of the target shared encoder currently returned by the first child node according to the first preset rule.

15. The apparatus according to claim 10, wherein the instruction execution system is further configured by the instructions to implement:
a generating module, configured to generate the target shared encoder to be trained according to a second preset rule.

* * * * *